United States Patent [19]

Shimizu et al.

[11] Patent Number: 5,861,880
[45] Date of Patent: Jan. 19, 1999

[54] EDITING SYSTEM FOR MULTI-MEDIA DOCUMENTS WITH PARALLEL AND SEQUENTIAL DATA

[75] Inventors: Takeshi Shimizu; Osamu Nakamura; Takahiro Saito, all of Ebina, Japan

[73] Assignee: Fuji Xerox Co., Ltd., Tokyo, Japan

[21] Appl. No.: 541,697

[22] Filed: Oct. 10, 1995

[30] Foreign Application Priority Data

Oct. 14, 1994 [JP] Japan .................................. 6-274247

[51] Int. Cl.⁶ ................................................ G06F 17/30
[52] U.S. Cl. ........................ 345/302; 345/328; 707/501
[58] Field of Search .................................. 395/762, 774, 395/806, 807, 173, 328, 348, 614, 615; 364/514 R, 514 A; 358/311; 345/302, 473, 328, 345; 707/501, 513, 103, 104

[56] References Cited

U.S. PATENT DOCUMENTS

| 5,307,456 | 4/1994 | MacKay | 395/328 |
| 5,515,490 | 5/1996 | Buchanan et al. | 395/807 |
| 5,519,828 | 5/1996 | Rayner | 395/326 |
| 5,604,857 | 2/1997 | Walmsley | 395/173 |
| 5,613,909 | 3/1997 | Stelovsky | 463/1 |

OTHER PUBLICATIONS

Iino et al., "An Object–Oriented Model for Spatio–Temporal Synchronization of Multimedia Information", Multimedia, 1994 *International Conference*, May 1994, pp. 110–119.

Meira et al., "A sripting language for multimedia presentation", *Multimedia, 1994 International Conference*, May 1994, pp. 484–489.

Little et al., "Interval–based conceptual models for time–dependent multimedia data", *IEEE Transactions on Knowledge and Data Engineering*, vol. 5, No. 4, Aug. 1993, pp. 551–563.

Kretz et al., Stardizing Hypermedia Information Objects, IEEE Communications Magazine, vol. 30, issue 5, 5/92, pp. 60–70.

IEEE Software, Interface Systems, "*A Construction Set for Multimedia Applications*", Jan. 1989, vol. 6 No. 1, Matthew E. Hodges et al., pp. 37–43.

In: Proceedings of the European Conference on Hypertext'92, Milan Italy, Dec. 1992, "*Specifying Temporal Behavior in Hypermedia Documents*" M. Cecilia Buchanan et al., pp. 1–10.

*Primary Examiner*—Stephen S. Hong
*Attorney, Agent, or Firm*—Oliff & Berridge, PLC

[57] ABSTRACT

Disclosed is a multi-media document editing system capable of editing display positions (spatial structures) of a group of multi-media data as well as display start and display end (temporal structures) in a simple manner through an editing interface. The multi-media document editing system is provided with a multi-media data storage means for storing a plurality of multi-media data elements, a multi-media document holding means for holding a multi-media document containing structural information relating to time and display position in the reproduction of each of the multi-media data stored in said multi-media data storage means, an editing means for connecting the elements in the structural information of the multi-media document through a link structure element, and a multi-media document reproducing means for reproducing each of the multi-media data elements stored in said multi-media data storage means in accordance with the structural information of the multi-media document which has been edited by said editing means.

1 Claim, 8 Drawing Sheets

EDITING SYSTEM FOR MULTI-MEDIA DOCUMENTS WITH PARALLEL AND SEQUENTIAL DATA

BACKGROUND OF THE INVENTION

1. Field of the Invention

The present invention relates to a multi-media document editing system for editing a document composed of multi-media data as elements. More particularly, the invention is concerned with a multi-media document editing system for editing a display position (a spatial structure) of a multi-media data group as well as display start and end (a time-related structure) thereof and reconstructing multi-media data held in a data base, an AV device, or the like, on the basis of the results of the editing.

2. Description of the Prior Art

The multi-media document is constructed as a document including not only such static media data as characters, graphics and static images but also such dynamic media data as voice and dynamic images. In editing the multi-media document, therefore, there usually is conducted an editing operation for designating a display position and a display timing for each multi-media data.

As to the display timing, not only the display sequence of multi-media data in the multi-media document is designated but also a correlation of multi-media data is taken into account. For this reason the designation of the display timing is called synchronous designation. The following two types of methods are available as synchronous designation methods. Further, there is an editing user interface based on each of the methods.

The first method is a synchronous designation method based on time designation. According to this method, a display time of each individual multi-media data is designated explicitly. The second method is a synchronous designation method based on relation designation. According to this method, an interdependence relation of multi-media data is designated.

The first synchronous designation method based on time designation is a method used, for example, in the editing system shown in the literature "IEEE SOFTWARE, Construction Set for multimedia Applications, Vol. 6 No. 1, Jan. 1989, pp. 37–43." According to this designation method, a reproduction time is designated explicitly for each multi-media data. An example of the user interface based on the first synchronous designation method is shown in FIG. 1. In the display screen of the user interface, a rectangle having a width in the X axis direction is proportional to a display time width that is disposed on a time axis extending from the left to the right. This user interface, called the time line interface, is advantageous in that a temporal structure of the multi-media data can be grasped intuitively.

When multi-media data are to be reproduced at the same time in the time line interface, as shown in FIG. 1, both are designated to the same display start time. This is attained by positioning the left end points of the rectangular multi-media data on the time axis exactly at X coordinates on the same time axis. In FIG. 1, VIDEO1, NARRATION1 and SUBTITLE are designated at the same start time.

According to the second synchronous designation method based on relation designation, a temporal structure is expressed on the basis of a correlation of multi-media data. For example, a time relation is expressed in the following manner: "The start event of a certain multi-media occurs after the occurrence of the end event of another element."

According to this synchronous designation method, even when the time information of a multi-media data is changed, the influence thereof can be limited to the object adjacent to that multi-media data.

For example, reference is here made to the literature "Specifying Temporal Behavior in Hypermedia Documents, Proceedings of the European Conference on Hypertext '92, Dec. 1992." As introduced in this literature, according to the synchronous designation method based on relation designation, multi-media data is expressed as a segment whose length is the display time width, and display start and end events are each expressed as a circle. Start and end events of the entire document are each expressed as a small rectangle. Further, a correlation of events is expressed in terms of a digraph. In FIG. 2 there is shown an example of user interface display in the synchronous designation method based on such relation designation.

As shown in FIG. 2, on the user interface display are arranged a plurality of segments (multi-media data) each having events at both ends thereof which events are each expressed as a circle. The user designates a relation of multi-media data by stretching a digraph between the events. Here there is no correlation between the spatial positional relation on the user interface and time.

The foregoing first synchronous designation method based on time designation involves a problem such that there is no time relation between multi-media data, so for example when the display time of one of the multi-media data arranged continuously on the time axis is changed, manual modification of the time information of each remaining multi-media data is required and thus the editing operation becomes complicated. For example, when VIDEO3 is to be inserted after VIDEO1 in FIG. 1, the user is required to move VIDEO2 by a distance corresponding to the display time width of VIDEO3 and thereafter dispose VIDEO3. This operation is complicated.

In this connection, in such a time line-based editing interface as shown in FIG. 1, the positions of VIDEO1, VIDEO2 and VIDEO3 represent display times of those elements, so for affecting a desired editing it is necessary to give consideration so that each element is disposed in a predetermined display time position without being superimposed on another. Thus, the user's burden in the editing operation is heavy.

In the case where the synchronism of plural elements is to be designated accurately by the synchronous designation method based on time designation, it is necessary to set the same time for all of the elements. In the example shown in FIG. 1, VIDEO1, NARRATION1 and SUBTITLE are arranged in the position corresponding to the time "3 seconds," but with this tacit synchronism relation kept intact, if the display start time of these multi-media data are to be set to the position corresponding to the time "1 second," it is necessary for the user to make rearrangement so that the left end points of those three multi-media data assume the position corresponding to the time "1 second."

More particularly, it is required that the tacit synchronism relation in the position of time "3 seconds" which has once been assumed by the user be destroyed and the operation for accurate time designation be newly performed for all of the related elements, which operation is troublesome. In the case of operation on the editing user interface, since the editing operation of elements alignment is a manual operation, the possibility of occurrence of an error is high.

The second synchronous designation method based on relation designation also involves a problem such that since there is no concept of time coordinates on the user interface, it is impossible to judge intuitively whether the reproduction timing of each multi-media data is relatively fast or slow. In FIG. 2, for example, which of NARRATION1 and NARRATION2 is to be reproduced first cannot be judged unless the digraph relation is traced.

The synchronous designation method based on relation designation further involves a problem such that it is impossible to collectively perform the operations of selecting plural multi-media data elements and moving them while maintaining their time relation in that range. For example, in FIG. 2, when NARRATION1 and VIDEO1 are to be "moved" behind VIDEO2 while maintaining start synchronism at display start event E1, it is necessary to take the following procedure.

(1) Delete all of the digraphs (those close to START, VIDEO1 and SUBTITLE) associated with the node of display start event E1.

(2) Delete the node of display start event E1.

(3) Delete all of the digraphs (those close to END and SUBTITLE) associated with the node of display end event E3.

(4) Move VIDEO1 to the position where E3 is the start event.

(5) Set the node of display end event E3 as the start event of VIDEO1.

(6) Create a node of display end event E4 as an end event of VIDEO1.

(7) Set a digraph between the node of display end event E3 and NARRATION1.

(8) Set a digraph between the node of display end event E4 and END node.

(9) Set a digraph among the node of display end event E2, START node and display start node of SUBTITLE.

Thus, when a desired editing operation is to be executed in the editing user interface according to the synchronous designation method based on relation designation, it is necessary to follow the above complicated procedure.

Another problem involved in the synchronous designation method based on relation designation is that the start timing of events depends on the reproduction time of multi-media data which is reproduced in advance of the event. For example, as shown in FIG. 2, in the case where there has been made a synchronous designation based on relation designation and the display start event E1 starts at the time "0 second," the start time of display end event E2 is "6 seconds," assuming that the reproduction of VIDEO1 requires 6 seconds. That is, the reproduction start time of VIDEO2 is the time "6 seconds" after the lapse of 6 seconds. If the reproduction start time of VIDEO2 is to be set to the time "10 seconds" while keeping VIDEO1 intact, the user is required to insert a 4-second, signal-free, multi-media data (blank) behind the display end event E2, then set a node of event E5 connected to the display end event of the 4-second, signal-free, multi-media data (blank) and connect the node of event E5 with the display start event of VIDEO2 through a digraph. Thus, the alterations are troublesome like the foregoing editing operation.

Generally, according to the conventional synchronous designation method based on relation designation, the temporal structure editing operation requires setting of both "synchronous events" and a digraph which expresses the relation between them and elements. This involves a drawback that in the case of performing the editing operation while maintaining the existing relation to a specific group of elements, the number of operations increases in proportion to associated elements. Another drawback is that the results of the editing operation are difficult to be judged intuitively on the user interface.

SUMMARY OF THE INVENTION

The present invention has been accomplished for solving the various problems mentioned above and it is an object of the invention to provide a multi-media document editing system which adopts the advantages of both the first synchronous designation method based on time designation and the second synchronous designation method based on relation designation and which is provided with an editing interface superior in operability and easy to grasp a document structure.

In the first aspect of the present invention, in order to achieve the above-mentioned object, there is provided a multi-media document editing system including a multi-media data storing means for storing a plurality of multi-media data elements, a multi-media document holding means for holding a multi-media document containing structural information on time and display position at the time of reproducing each element of the multi-media data stored in the multi-media data storing means, an editing means for editing to connect the structural information elements of the multi-media document through a link structure element, and a multi-media document reproducing means for reproducing each element of the multi-media data stored in the multi-media data storing means on the basis of the structural information of the multi-media document which has been edited by the editing means.

According to the multi-media document editing system in the second aspect of the present invention, the structural information relating to time of the multi-media document stored in the multi-media document storing means is composed of sequential structure elements which control sequential reproduction information pieces of multi-media data and parallel structure elements which correlate and control the sequential structure elements through synchronous links which function to synchronize the reproduction timing, and the editing means performs the editing operation for each of the sequential and parallel structure elements in the structural information of the multi-media document.

According to the multi-media document editing system according to the third aspect of the present invention, the structural information stored in the multi-media document holding means is composed of sequential structure elements which control sequential reproduction information pieces of the multi-media data through time sequence links, parallel structure elements which control the relation between the sequential structure elements by the use of both synchronous links and virtual synchronization time, and track structure elements which control display coordinate values of multi-media data based on the sequential structure elements allocated to the same display area, and the editing means displays the multi-media data, sequential structure elements, parallel structure elements, track structure elements and synchronous links as rectangles and markers in a two-dimensional space based on virtual time on an editing interface screen, then with the thus-displayed elements as units, performs such editing operations as addition, deletion and moving on the editing interface screen.

According to the multi-media document editing system in the fourth aspect of the present invention, the editing means selects plural elements to be subjected to the editing operation for the multi-media document and then performs the editing operation for the selected plural elements while maintaining the relation between the elements.

According to the multi-media document editing system in the fifth aspect of the present invention, when the editing means performs the editing operation with the sequential and parallel structure elements in the structural information of the multi-media document as units, and in the case where time offset is designated to synchronous links which are designated in association with the sequential or parallel structure elements, the multi-media document reproducing means schedules, in accordance with the time offset, the display timing of each element of multi-media data to be reproduced.

According to the multi-media document editing system in the sixth aspect of the present invention, when the editing means performs the editing operations of addition, deletion and moving on the editing interface screen for the multi-media data, sequential and parallel structure elements, track structure elements and synchronous links, and in the case where there occurs superimposition on the time axis of multi-media data as a result of the said editing operations, the display position corresponding to the parallel structure on the editing interface screen is rearranged, while in the case where there occurs a time interval between sequential and parallel structures, a blank element is inserted in the associated sequential structure.

According to the multi-media document editing system in the seventh aspect of the present invention, when performing the editing operations of addition, deletion and moving on the editing interface screen for the multi-media data, sequential and parallel structure elements, track structure elements and synchronous links, the editing means performs the editing operations temporarily, and in the case where there occurs superimposition on the time axis of multi-media data, the editing means does not execute the editing operations and tells the operator to that effect.

In the multi-media document editing system according to the first aspect of the present invention constructed as above, the multi-media data storing means stores a multi-media document containing a structural information relating to reproduction time and display position of each element of the multi-media data stored in the multi-media data storing means. For the multi-media document, the editing means performs an editing to connect the elements of the structural information of the multi-media document through link structure elements. Further, on the basis of the structural information of the multi-media document thus edited by the editing means, the multi-media document reproducing means reproduces each element of the multi-media data stored in the multi-media data storing means.

In the multi-media document editing system according to the second aspect of the invention, the structural information relating time of the multi-media document stored in the multi-media document storing means is composed of sequential structure elements which control sequential reproduction information pieces of the multi-media data in order of time and parallel structure elements which correlate and control the sequential structure elements through synchronous links which function to synchronize the reproduction timing, and so the editing means performs editing for the said structural information. This editing operation is conducted with the sequential and parallel structure elements in the structural information of the multi-media document as units. Thus, the editing for the temporal structure of multi-media data can be done easily without performing any complicated operation. For example, all that is required is merely performing the editing operation of the elements connection.

In the multi-media document editing system according to the third aspect of the present invention, the structural information stored in the multi-media document holding means is composed of sequential structure elements which control sequential reproduction information pieces of the multi-media data through time sequence links, parallel structure elements which control the relation between the sequential structure elements by the use of both synchronous links and virtual synchronization time, and track structure elements which control display coordinate values of multi-media data based on the sequential structure elements allocated to the same display area. The editing means performs editing for those structural information elements. In this case, the editing means displays the multi-media data, sequential structure elements, parallel structure elements, track structure elements and synchronous links as rectangles and markers in a two-dimensional space based on virtual time on the editing interface screen. Further, with the thus-displayed elements as units, the editing means performs such editing operations as addition, deletion and moving on the same screen. Thus, for the elements displayed on the editing interface screen, editing can be done by similar operations as in the editing of graphic elements. Moreover, since the structural information elements to be edited are displayed on the editing interface screen, a temporal structure of the multi-media document can be grasped intuitively, thereby facilitating the editing operation.

Consequently, such temporal structure editing operations as addition, deletion and moving can be done using structural information elements displayed in a two-dimensional space as units, and the editing results are reflected in the document temporal structure. Now it is possible to provide a multi-media document editing system provided with an editing interface which permits easy grasping of the entire document temporal structure, also permits the execution of editing through a reduced number of procedural steps and is easy to operate.

In the multi-media document editing system according to the fourth aspect of the present invention, the editing means selects plural elements to be subjected to the editing operation for the multi-media document and then performs the editing operation for the selected plural elements while maintaining the relation between the elements. As a result, it becomes possible to perform a batch editing operation for the structural information elements of the multi-media document.

In the multi-media document editing system according to the fifth aspect of the present invention, when the editing means performs the editing operation with the sequential and parallel structure elements in the structural information of the multi-media document as units, and in the case where time offset is designated to synchronous links which are designated in association with the sequential or parallel structure elements, the multi-media document reproducing means schedules, in accordance with the said time offset, the display timing of each element of multi-media data to be reproduced. Consequently, the reproduction time of the multi-media data included in the sequential structure can be adjusted easily.

In the multi-media document editing system according to the sixth aspect of the invention, when the editing means performs the editing operations of addition, deletion and moving on the editing interface screen for the multi-media data, sequential and parallel structure elements, track structure elements and synchronous links, and in the case where there occurs superimposition on the time axis multi-media data as a result of the said editing operations, the display position corresponding to the parallel structure on the editing interface screen is rearranged, while in the case where there occurs a time interval between the sequential structure and the parallel structure, a blank element is inserted in the associated sequential structure. Consequently, a suitable display position corresponding to the parallel structure is rearranged on the editing interface screen so as to maintain the entire time consistency of the structural information of the multi-media document in accordance with the batch editing operation for plural elements. Thus, the editing operation can be done easily.

In the multi-media document editing system according to the seventh aspect of the present invention, when performing the editing operations of addition, deletion and moving on the editing interface screen for the multi-media data, sequential and parallel structure elements, track structure elements and synchronous links, the editing means performs the editing operations temporarily, and in the event of occurrence of superimposition on the time axis of multi-media data, the editing means does not execute the editing means and tells the operator to that effect. Thus, in the case where the consistency of temporal structure is lost as a result of a batch editing operation for plural elements of the structural information, the editing operation is not executed and a notice to that effect is merely transmitted to the operator, so even with an editing interface which permits editing operations to be executed in a simple manner, it is possible to ensure the editing operations without any inappropriateness.

DESCRIPTION OF THE PREFERRED EMBODIMENTS

Figure 1:
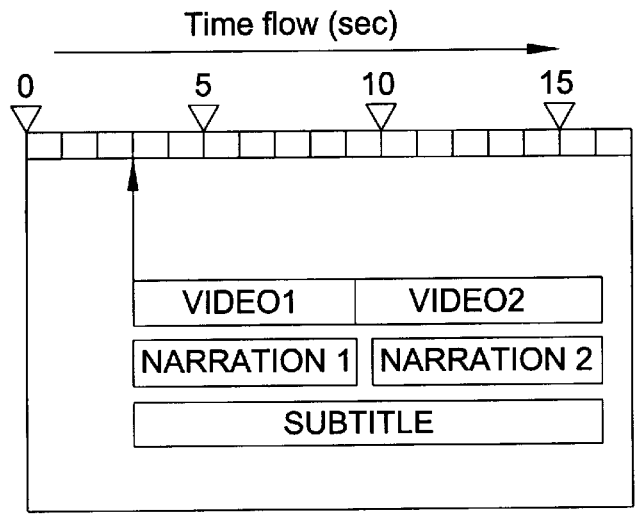
FIG. 1 is a diagram showing an example of a user interface based on time designation in the prior art.
Figure 2:
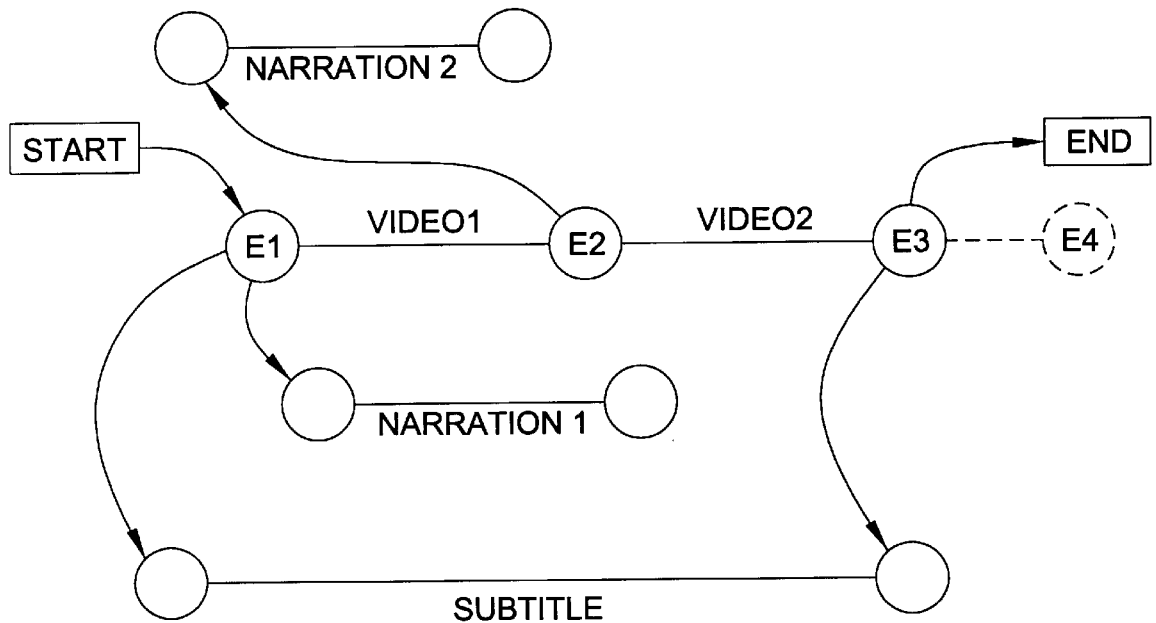
FIG. 2 is a diagram showing an example of a user interface based on relation designation in the prior art.
Figure 3:
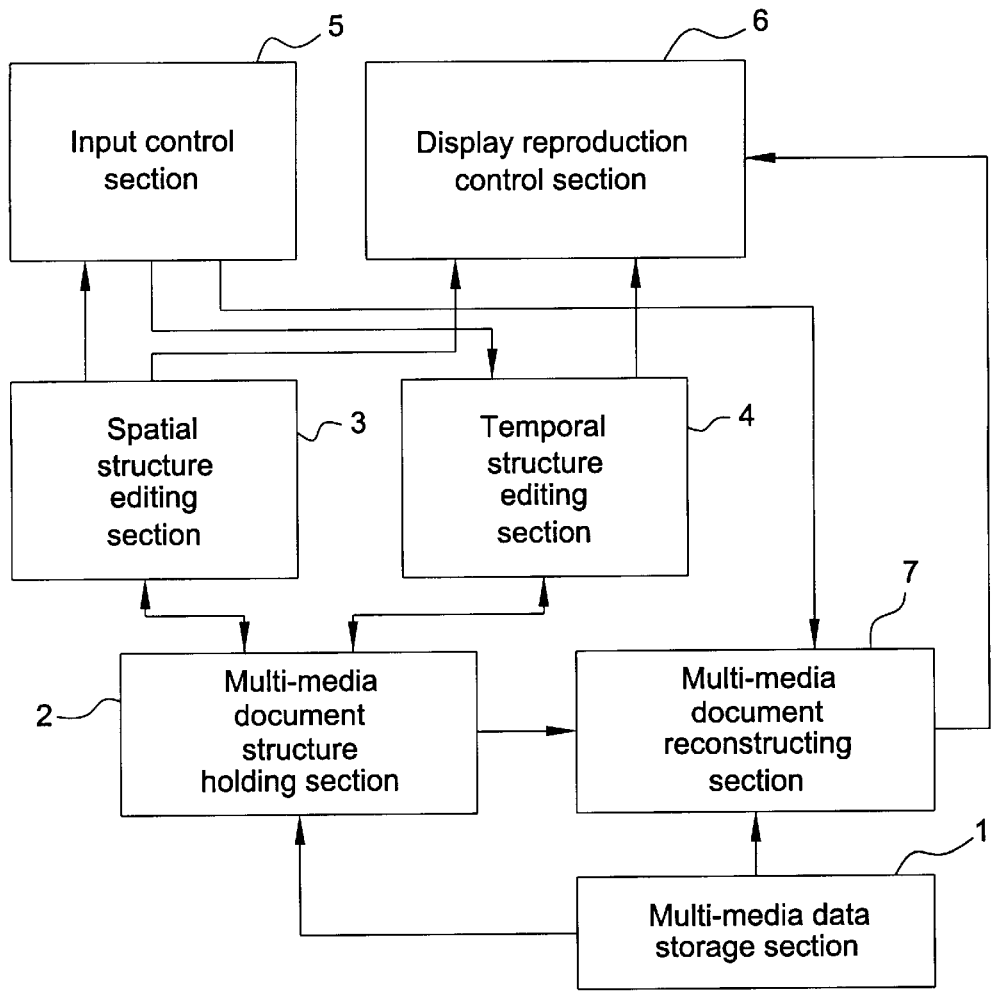
FIG. 3 is a block diagram showing the configuration of a principal portion of a multi-media document editing system according to the first embodiment of the present invention.

Embodiments of the present invention will be described hereinunder with reference to the accompanying drawings. FIG. 3 is a block diagram showing the configuration of a principal portion of a multi-media document editing system according to the first embodiment of the present invention. In FIG. 3, the numeral 1 denotes a multi-media data storing section, numeral 2 denotes a multi-media document structure holding section, numeral 3 denotes a spatial structure editing section, 4 a temporal structure editing section, 5 an input control section, 6 a display reproduction control section, and 7 a multi-media document reconstructing section.

The multi-media data storing section 1 stores multi-media data elements as constituent elements of a multi-media document. The multi-media document structure holding section 2 holds as a multi-media document structural information relating to the elements of multi-media data as well as spatial structure and temporal structure elements given thereto. The spatial structure editing section 3 is provided with an editing interface for changing or updating the structural information relating to spatial structure elements of the multi-media document held in the multi-media document structure holding section 2. The temporal structure editing section 4 is provided with an editing interface for changing or updating the structural information relating to the temporal structure elements of the multi-media document held in the multi-media document holding section. The input control section 5 controls the user input made from an input device such as a mouse or a keyboard. The display reproduction control section 6 controls the display reproduction of multi-media data such as text, graphic, image, dynamic image and voice. Further, in accordance with instructions given from the input control section 5 and on the basis of the structural information of the multi-media document held in the multi-media document structure holding section 2, the multi-media document reconstructing section 7 reconstructs the elements of the multi-media data stored in the multi-media data storing section 1 with respect to time and space and sends the results to the display reproduction control section 6, where reproduction and display of the multi-media document are performed.

For the editing of structural information relating to the spatial structure of multi-media data in the multi-media document editing system of the first embodiment, the operator is required to designate coordinate information for a set (track structure element) of multi-media data displayed in the same area which designation is performed by user interface operation for the spatial structure editing section 3. On the basis of the designated coordinate information the space information editing section 3 updates the spatial structure information in the document structure held in the multi-media document structure holding section.

By the temporal structure editing section 4 the temporal structure information of multi-media data is displayed on an editing interface screen in a two-dimensional space based on virtual time. For editing the temporal structure information the operator is required to correlate a multi-data group with a sequential structure element, a parallel structure element and a track structure element through link structure elements such as sequential links or synchronous links and through editing operation on the editing interface screen performed by the temporal structure editing section 4. On the basis of this editing operation the temporal structure editing section 4 updates the temporal structure in the document structure held in the multi-media document structure holding section 2. Further, on the basis of the updated information the temporal structure editing section 4 updates the temporal structure information displayed in two dimensions on the interface.

As to the multi-media document after completion of editing, the multi-media document reconstructing section 7 refers to the document structure held in the multi-media document structure holding portion 2, retrieves entity data of the necessary multi-media data through the multi-media data storing section 1 and reconstructs it on the basis of the structural information of given spatial structure and temporal structure, whereby the multi-media document editing processing is completed.

Figure 4:
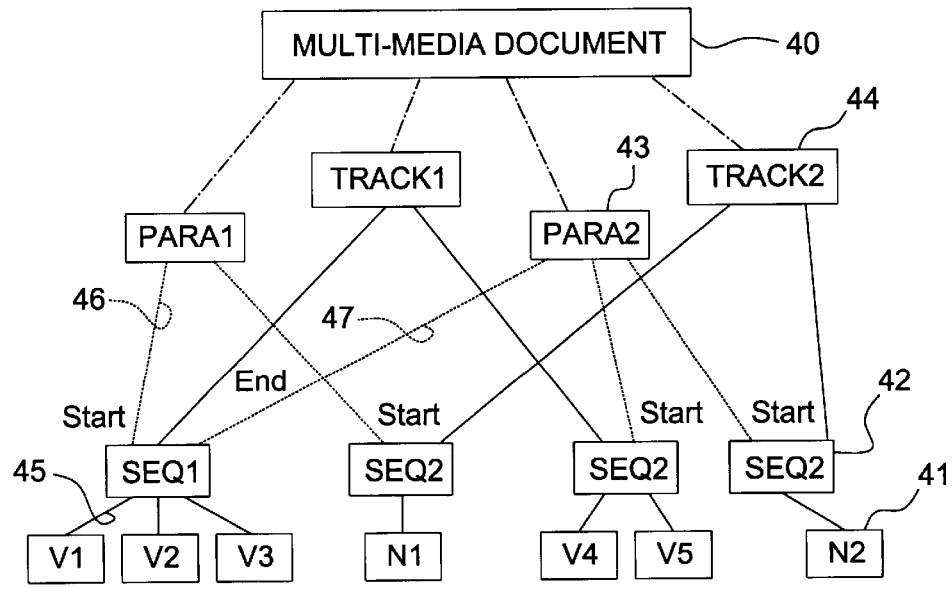
FIG. 4 is a diagram showing an example of a tree structure data representing a document structure of a multi-media document in a multi-media document structure holding section.

FIG. 4 is a diagram showing an example of a tree structure which represents a document structure of the multi-media document held in the multi-media document structure holding section 2. In FIG. 4, V1 to V5 and N1, N2, which are represented by the reference numeral 41, denote multi-media data elements corresponding to dynamic images and multi-media data elements corresponding to narrations, respectively SEQ1 to SEQ4, which are referred to by the reference numeral 42 as structure data of sequential structure elements, denote structure data of sequential structure elements. PARA1 and PARA2, referred to by the reference numeral 43, denote structure data of parallel structure elements. Likewise, TRACK1 and TRACK2 referred to by the reference numeral 44 denote structure data of track structure elements.

In the tree structure shown in FIG. 4, the dynamic images V1, V2 and V3 are linked to the sequential structure element SEQ1, while the narration N1 is linked to the sequential structure element SEQ2. Likewise, the dynamic images V4 and V5 are linked to the sequential structure element SEQ3 and the narration N2 is linked to the sequential structure element SEQ4. In this case, time sequence links are used as order links 45.

The parallel structure element PARA1 links the sequential structure elements SEQ1 and SEQ2 through start synchronous links 46. In such a linked state, the head data (dynamic image V1) in the sequential structure element SEQ1 and the head data (narration N1) in the sequential structure element SEQ2 are reproduced and displayed simultaneously. Since the dynamic images V2 and V3 are merely linked by the time sequence links 45 to the sequential structure element SEQ1, the end of the reproduction of the dynamic image V1 is followed continuously by reproduction of the dynamic image V2, and subsequently also continuously followed by reproduction of the dynamic image V3.

The parallel structure element PARA2 links the sequential structure elements SEQ3 and SEQ4 through start synchronous links 46, and further links the sequential structure element SEQ1 through an end synchronous link 47. In this linked state, after the end of reproduction of the multi-media data (V1 to V3) which are linked to the sequential structure element SEQ1, that is, after the end of reproduction of the dynamic image V3, the head data (dynamic image V4) in SEQ3 and the head data (narration N2) in SEQ4 are reproduced and displayed simultaneously. After the end of reproduction of the dynamic image V4, the dynamic image V5 is reproduced in accordance with the time sequence link in SEQ3.

Figure 5:
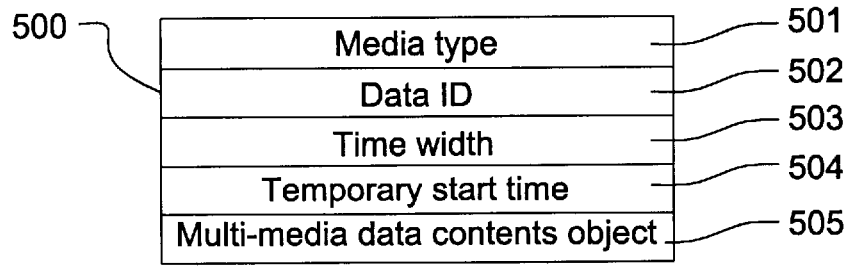
FIG. 5 is a diagram showing an example of a data structure of multi-media data.

FIG. 5 is a diagram showing an example of a data structure of a multi-media data element. As shown in the same figure, a data structure 500 of a multi-media data element comprises a media type slot 501 which holds type data for discriminating the type of multi-media data, a data ID slot 502 which holds ID data as an identifier of the data structure, a time width slot 503 which holds a display time width of the multi-media data, a virtual start time slot 504 which holds a reproduction start time in the case where the multi-media data is disposed on virtual time on the editing interface, and an entity slot 505 which holds a pointer to the actual multi-media data contents object.

Figure 6:
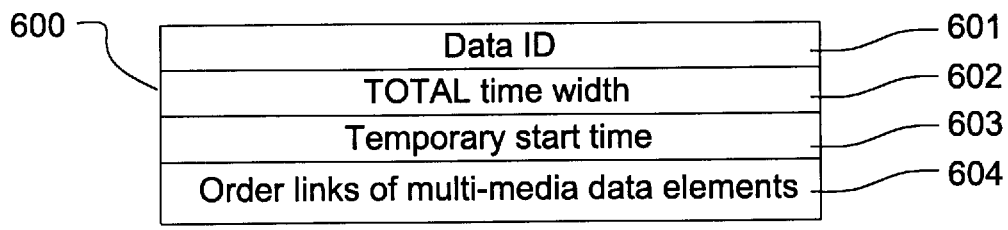
FIG. 6 is a diagram showing an example of a data structure of a sequential structure element.

FIG. 6 is a diagram showing an example of a data structure of a sequential structure element. As shown in the same figure, a data structure 600 of a sequential structure element comprises a data ID slot 601 which holds ID data as an identifier of the data structure, a TOTAL time width slot 602 which holds the sum total of display time widths of the multi-media data elements, a virtual start time slot 603 which holds a virtual reproduction start time of a multi-media data element linked to the sequential structure element in the case where the sequential structure element is disposed on virtual time on the editing interface screen, and a member slot 604 which holds order links of multi-media data elements belongs to the sequential structure element.

Figure 7:
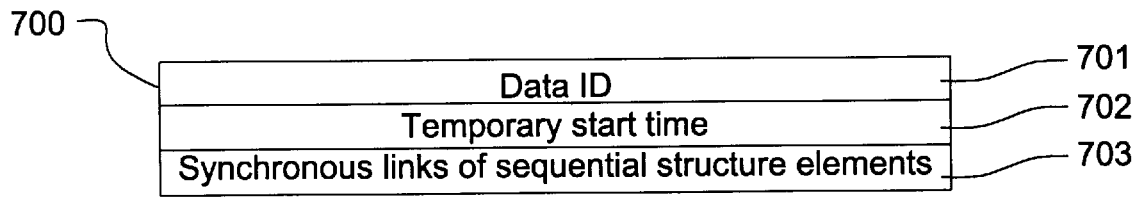
FIG. 7 is a diagram showing an example of a data structure of a parallel structure element.

FIG. 7 is a diagram showing an example of a data structure of a parallel structure element. As shown in the same figure, a data structure 700 of a parallel structure element comprises a data ID slot 701 which holds ID data as an identifier of the data structure, a virtual start time slot 702 which holds a virtual reproduction start time of a multi-media data element linked to the parallel structure element in the case where the parallel structure element is disposed on virtual time on the editing interface screen, and a member slot 703 which holds a synchronous link of a sequential structure element associated with the parallel structure element.

Figure 8:
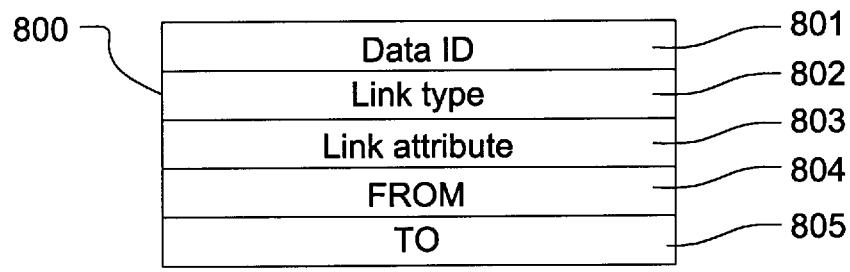
FIG. 8 is a diagram showing an example of a data structure of a link structure element.

FIG. 8 is a diagram showing an example of a data structure of a link structure element. As shown in the same figure, a data structure 800 of a link structure element comprises a data ID slot 801 which holds ID data as an identifier of the data structure, a link type slot which holds the link type (order link, synchronous link) data, a link attribute value slot 803 which holds a link attribute value for designating either START or END synchronism in the case of synchronous link, a FROM slot 804 which holds a pointer to the source side structure information element of the link structure element, and a TO slot 805 which holds a pointer to the destination side structure information element of the link structure element.

Figure 9:
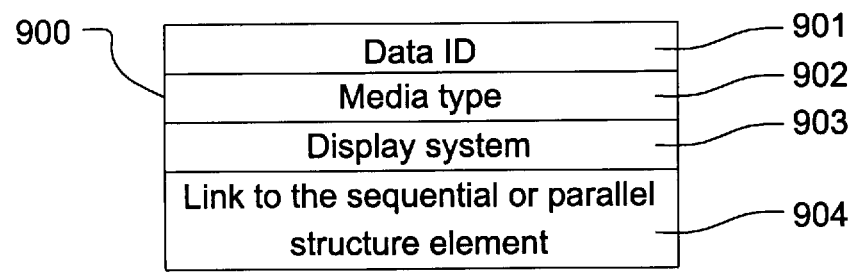
FIG. 9 is a diagram showing an example of a data structure of a track structure element.

FIG. 9 is a diagram showing an example of a data structure of a track structure element. As shown in the same figure, a data structure 900 of a track structure element comprises a data structure of a track structure element, a data ID slot 901 which holds ID data as an identifier of the data structure, a media type slot 902 which holds the type of multi-media data element held (as linked destination) by the track structure element, a display stream slot 903 which holds a pointer to a display stream (display area) as an output destination of the track, and a member slot 904 which holds a link to the sequential or parallel structure element associated with the track.

Figure 10:
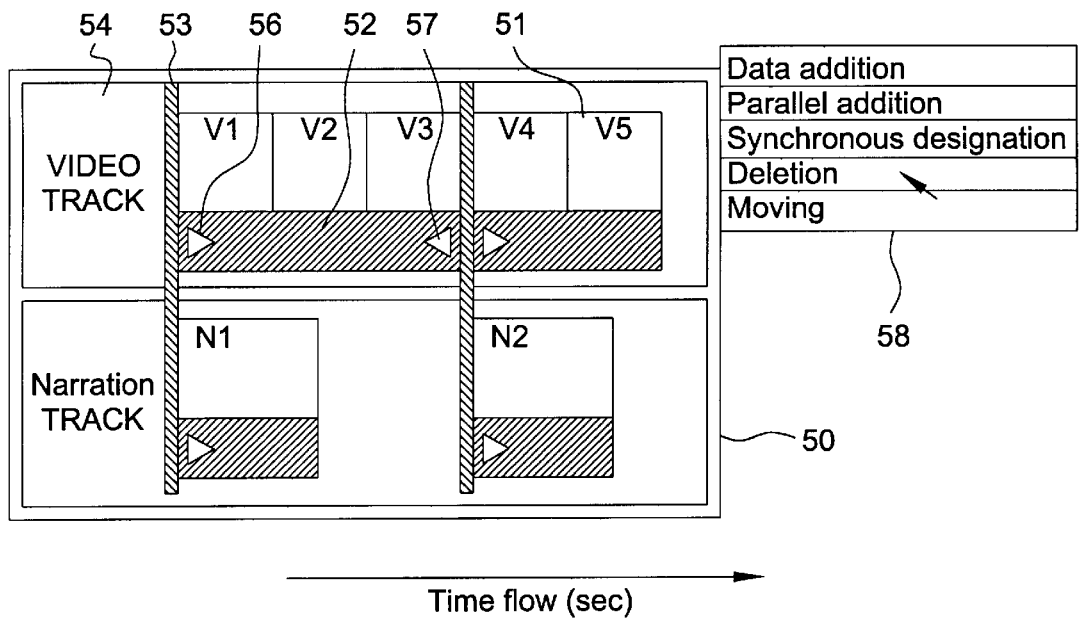
FIG. 10 is a diagram showing an example of a display screen for explaining a user interface operation in a temporal structure editing section.

FIG. 10 is a diagram showing an example of a display screen which explains the user interface operation in the temporal structure editing section. The display contents of this display screen corresponds to the document structure shown in FIG. 4. In FIG. 10, the numeral 50 denotes an editing interface screen, numeral 51 denotes a display pattern of a multi-media data element, numeral 52 denotes a display pattern of a sequential structure element, 53 a display pattern of a parallel structure element, 54 a display pattern of a track structure element, 56 a display pattern of a synchronous link (start), 57 a display pattern of a synchronous link (end), and 58 an editing operation menu.

In this way the objects to be operated are indicated with symbols. The symbols as referred to herein represent characters, graphics, symbols, or combinations thereof or combinations with colors.

Here it is assumed that the virtual time advances from left to right along X axis, and display patterns of track structure elements TRACK1 and TRACK2 in the document structure shown in FIG. 4 are displayed dividedly in two upper and lower stages as sideways long rectangles describing the track names "VIDEO TRACK" and "Narration TRACK." Each of the multi-media data elements (V1 to V5, N1, N2) is displayed having an X-axis width corresponding to the reproduction display time width on the display pattern 54 of the track structure element according to the media type held.

The display pattern of the sequential structure element 52 is a rectangle having an X-axis width corresponding to the total of the reproduction display times of the multi-media data elements (V1 to V5, N1, N2) linked by the order links. The multi-media data element column (V1 to V3, N1) sandwiched in between display patterns of parallel structure element 53 can also be regarded as a tacit display of sequential structure element 52, so unlike the display example of such an editing interface screen 50 as shown in FIG. 10, the editing interface screen may be a screen which does not display the display pattern of sequential structure element 52 explicitly.

The display pattern of parallel structure element 53 is displayed as a segment (a vertically elongated rectangle in FIG. 10) which crosses all the tracks of the multi-media document in Y axis direction. In this connection, since the virtual time is assumed to advance from left to right along X axis, one such segment becomes a virtual time that is given temporarily to the parallel structure element.

The display patterns of synchronous links 56,57 are displayed as markers for expressing the relation between the display pattern of sequential structure element 52 and the display pattern of parallel structure element 53. In FIG. 10, the display pattern of a start synchronous link is displayed in the form of a rightward triangle, while the display pattern of an end synchronous link 57 is displayed in the form of a leftward triangle.

Figure 11:
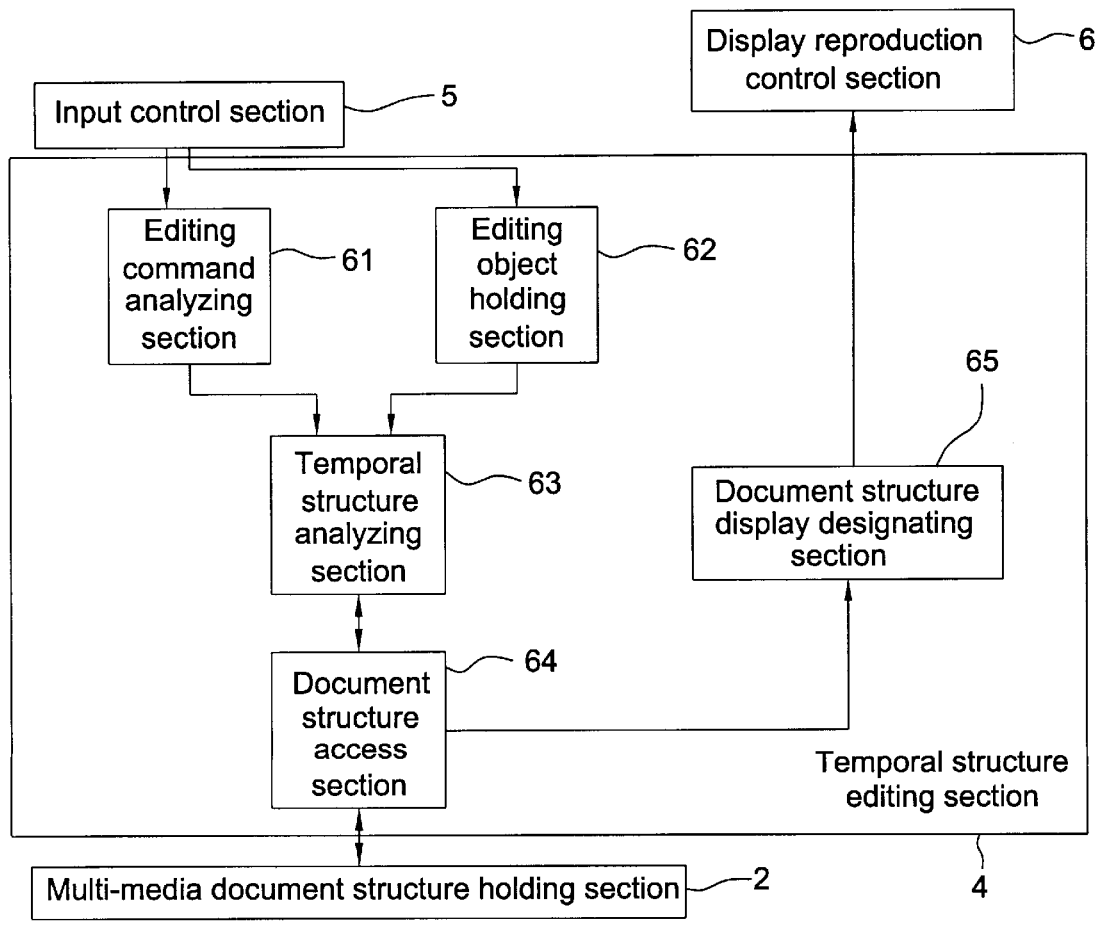
FIG. 11 is a block diagram showing in detail the configuration of the temporal structure editing section in the multi-media document editing system of this embodiment.

FIG. 11 is a block diagram showing in detail the configuration of the temporal structure editing section in the multi-media document editing system of the first embodiment. In the same figure, the numeral 2 denotes a multi-media document structure holding section, numeral 4 denotes a temporal structure editing section, 5 an input control section, and 6 a display reproduction control section. Further, the numeral 61 denotes an editing command analyzing section, numeral 62 denotes an editing object holding section, 63 a temporal structure analyzing section, 64 a document structure access section, and 65 a document structure display designating section.

The operation of the temporal structure editing section will now be described with reference to FIG. 11. Here the temporal structure editing processing is executed in accordance with editing instructions issued by operation on an editing interface screen 50 such as in FIG. 10. More specifically, once an operation is performed on the screen 50, this operation is received by the input control section 5, which in turn sends input event data to the temporal structure editing section 4.

In the section 4, the editing command analyzing section 61 analyzes editing commands (addition command, deletion command, moving command) from the input event data provided by the input control section 5. The editing object holding section 62 groups the temporal structure editing objects (multi-media data element, sequential structure element, parallel structure element) selected by the input control section 5 into one or plural groups and holds them. For executing editing instructions designated by the editing command analyzing section 61 and editing object holding section 62, the temporal structure analyzing section 63 interprets the temporal structure of the multi-media document structure information provided from the document structure access section 64 and executes an editing operation for the document structure information.

At this time, the temporal structure analyzing section 63 checks whether there is any mismatching or not with respect to the temporal structure after the editing operation, and if there is any mismatching, the same section instructs the document access section 64 to perform an adjusting operation for correction of the mismatching. The document access section 64 performs the operations of reading a document for editing from the multi-media document structure holding section 2 and updating a document structure which reflects the results of editing. In accordance with instructions given from the document structure access section 64 the document structure display designating section 65 makes arrangement and display of the document structure to be edited in a two-dimensional space as shown in FIG. 10.

Figure 12:
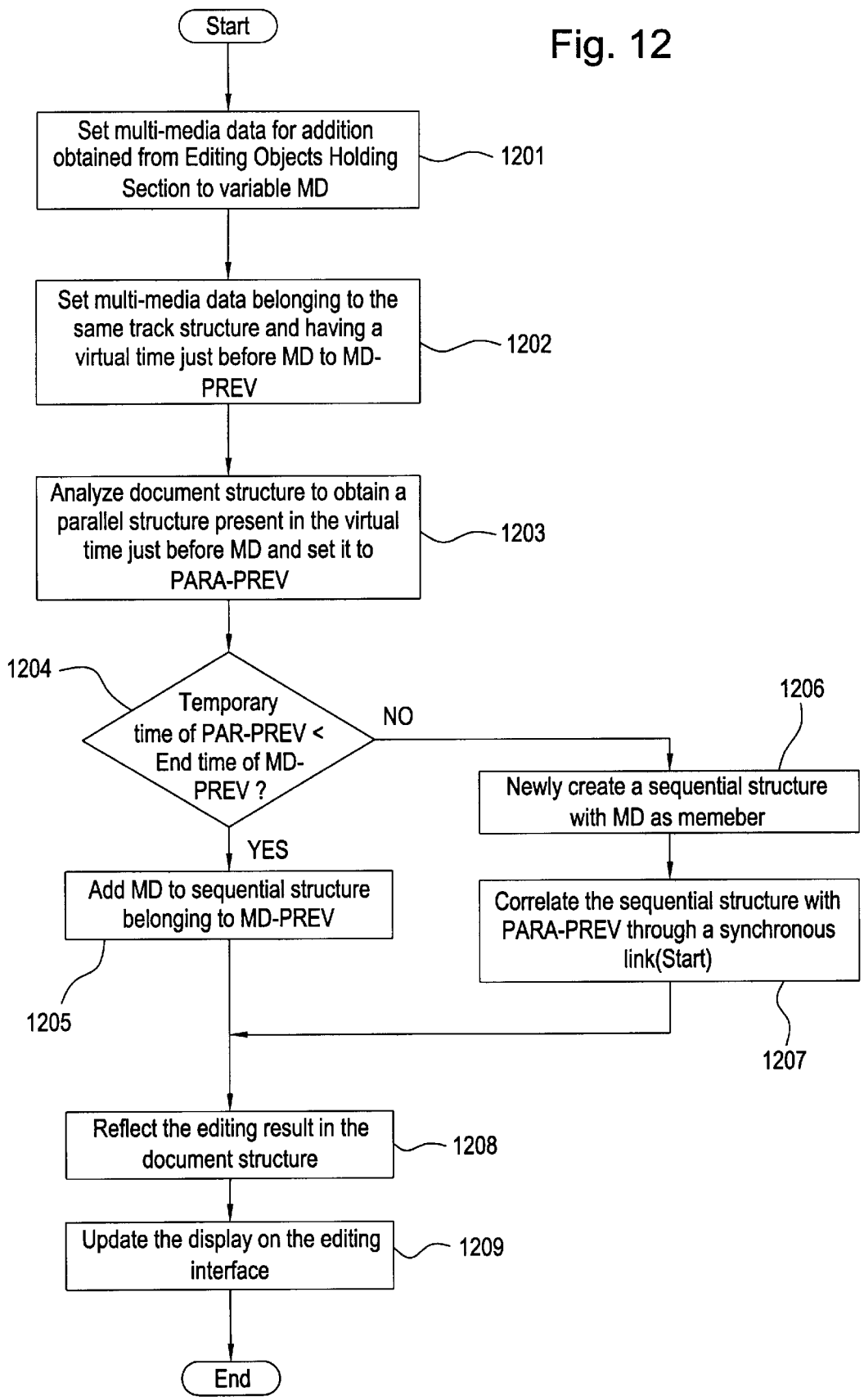
FIG. 12 is a flowchart explaining the flow of processing executed when there has been performed an editing operation for the addition of multi-media data.

FIG. 12 is a flowchart explaining the flow of processing executed when there has been conducted an editing operation for the addition of multi-media data. This editing processing is executed mainly by the temporal structure editing section 4. The following description is now provided about editing operations for the addition of multi-media data with reference to FIGS. 11 and 12.

Once the processing is started, first in step 1201, the temporal structure analyzing section 63 holds as variable MD the multi-media data (element) to be added which has been obtained from the editing objects holding section 62. Next, in step 1202, the temporal structure analyzing section 63 retrieves the multi-media data (element) belonging to the same track structure (element) as the multi-media data of variable MD and having a virtual time just before the multi-media data of variable MD. This is done by analyzing the multi-media document structure held in the multi-media document structure holding portion 2, through the document structure access portion 64. As a result, a multi-media data (element) meeting the required condition is set to variable MD-PREV.

Then, in step 1203, the document structure is analyzed (the structural information of the multi-media document is analyzed) by the temporal structure analyzing section 63 to obtain the parallel structure element present in the virtual time just before the multi-media data of variable MD, and the result obtained is set to variable PARA-PREV. Then, in step 1204, a comparison is made between the temporary time of the parallel structure element of variable PARA-PREV and the end time which the multi-media data of variable MD-PREV has. If the temporary time of variable MD-PREV is larger, the processing routine advances to step 1205, while in the contrary case, the processing routine advances to step 1206.

In step 1205, the multi-media data of variable MD is added to the member end of the sequential structure element that belongs to the multi-media data of variable MD-PREV. Then, the processing routine advances to step 1208. On the other hand, in step 1206, the temporal structure analyzing section 63 creates a new sequential structure element and registers thereto the multi-media data of variable MD as a member. Next, in step 1207, the temporal structure analyzing section 63 correlates the newly created sequential structure element with the parallel structure element held in the variable PARA-PREV through a start synchronous link. Then, the processing routine advances to step 1208.

In step 1208, the document structure access section 64 is instructed so as to reflect the results of the editing in the document structure (structural information) on the multi-media document structure holding section 2. Then, in the next step 1209, the display on the editing interface screen is updated. More specifically, reading out the updated document structure (structural information) of the multi-media document through the document structure access section 64, the document structure display instructing section 65 designates the update display to the display reproduction control section 6 while making the contents of that document structure into display contents on the editing interface screen expressed in two dimensions (FIG. 10).

By the above editing operation performed by the temporal structure editing section 4 on the editing interface screen the new multi-media data element can be added easily to the multi-media document. In this case, as an established operation, a synchronous link to a nearby parallel structure element can also be set automatically.

Figure 13:
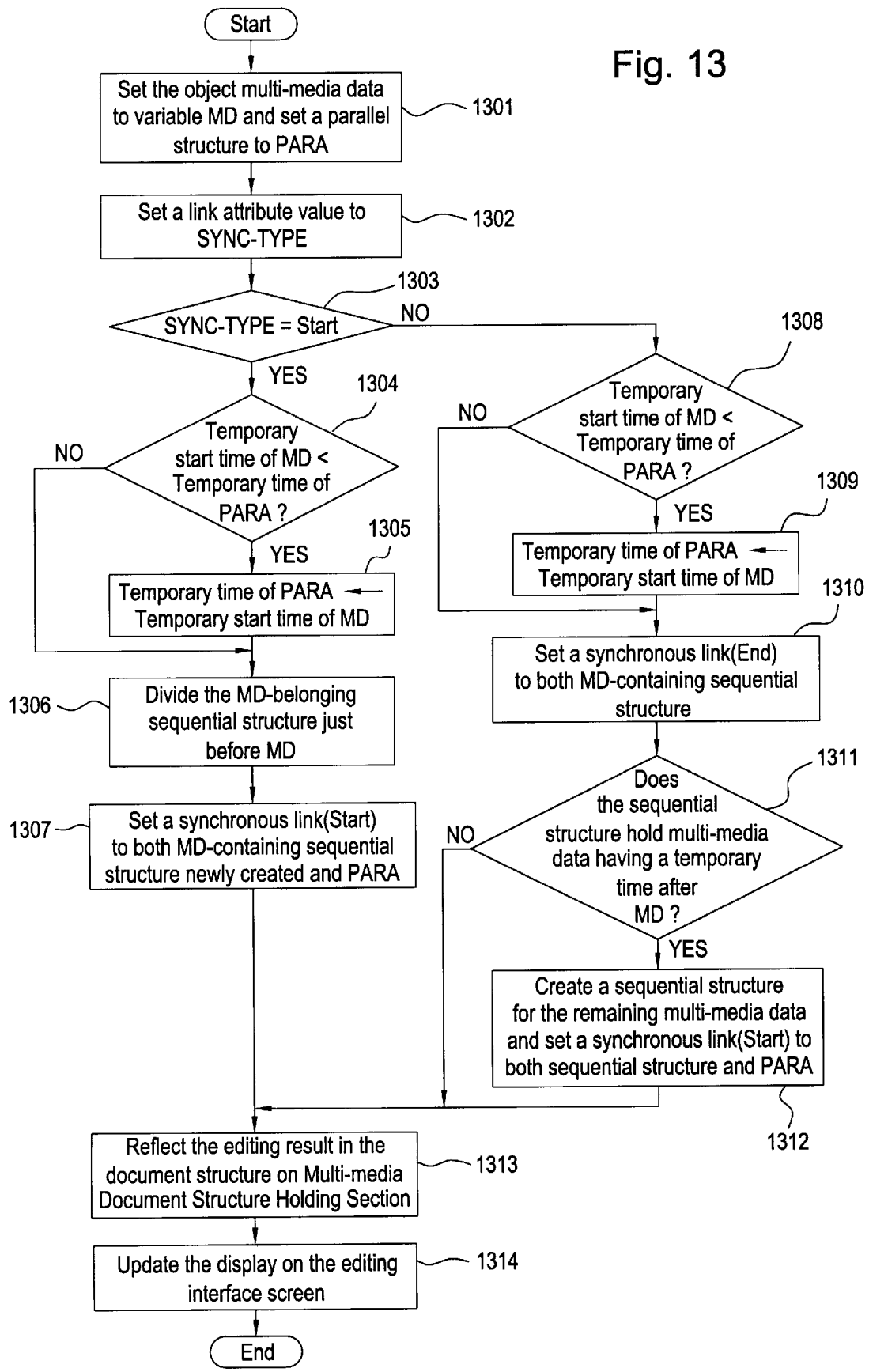
FIG. 13 is a flowchart explaining an operation example of an editing processing executed when there has been made a synchronous link designation to the parallel structure element for multi-media data contained in the sequential structure element.

FIG. 13 is a flowchart explaining an operation example of an editing processing executed when there has been made a synchronous link designation to the parallel structure element for multi-media data contained in the sequential structure element. Also in this case, the processing is advanced mainly by the temporal structure editing section 4, so the following description is now provided with reference to FIGS. 11 and 13.

Upon start of the editing processing, first in step 1301, the multi-media data (element) for editing which has been obtained from the editing objects holding section 62 is set to variable MD, and the parallel structure element is set to variable PARA. Then, in step 1302, a link attribute value (Start or End) obtained from the editing command analyzing section 61 is set to variable SYNC-TYPE. Next, in step 1303, the contents of the variable SYNC-TYPE are judged, and if the link attribute value is "Start," the processing routine advances to step 1304, while if not, the flow shifts to step 1308.

In step 1304, a comparison is made between the temporary start time of the multi-media data of variable MD and the temporary time of the parallel structure element of variable PARA. As a result of this comparison, if the temporary start time of the multi-media data of variable MD is smaller, then in the next step 1305, the temporary time of the parallel structure element of variable PARA is used as the temporary start time of the multi-media data of variable MD and the processing routine advances to step 1306, while if the answer in step 1304 is negative, the flow skips over to step 1306.

In step 1306, the sequential structure element containing the multi-media data of variable MD is divided into two sequential structure element groups just before the multi-media data of variable MD. Then, in step 1307, a start synchronous link is set to each of the newly created sequential structure element containing the multi-media data of variable MD and the parallel structure element of variable PARA.

On the other hand, if in the judgment of step 1303 the link attribute value as the contents value of variable SYNC-TYPE is not "Start" and the processing routine has advanced to step 1308, then in step 1308 a comparison is made between the temporary start time of the multi-media data of variable MD and the temporary time of the parallel structure element of variable PARA and if the temporary start time of the multi-media data of variable MD is smaller, then in step 1309 the temporary time of the parallel structure element of variable PARA is used as the temporary end time of the multi-media data of variable MD, and the processing routine advances to step 1310. In a case other than this case, the flow skips over to step 1310.

In step 1310, an end synchronous link is set to each of the sequential structure element containing the multi-media data of variable MD and the parallel structure element of variable PARA. Then, in step 1311, judgment is made as to whether the sequential structure element to be edited holds multi-media data having a larger temporary time than that of the multi-media data of variable MD. If the answer is affirmative, then in step 1312, a sequential structure element is created for the remaining multi-media data and a start synchronous link is set to each of the thus-created sequential structure element and the parallel structure element of variable PARA, then the processing routine advances to step 1313. On the other hand, if in step 1311 it is impossible to judge that the sequential structure element to be edited holds such multi-media data as mentioned above, the step 1312 is skipped and the flow advances to step 1313.

In step 1313, the editing result is reflected in the multi-media document structure at the multi-media document structure holding section 2. Then, in step 1314, the display on the editing interface screen is updated to complete the processing. Through such editing processing the designation of a synchronous link can be done in a simple manner by the user.

In the multi-media document structure editing processing described above, there is performed an editing operation of "moving" each element individually, and in such a "moving" editing operation the same editing operation is performed repeatedly for plural objects, so by adopting a configuration wherein plural objects for operation can be selected and wherein plural variable areas in the editing processing are provided in correspondence to the structural elements of those objects, it becomes possible to hold a time relation between the selected multi-media data in a relative manner and in this state execute the "moving" editing operation. Consequently, the multi-media document structure editing processing can be executed efficiently.

An example of such configuration will now be described as the second embodiment. The multi-media document editing system of the second embodiment is constructed so that the editing operation can be done for plural objects, which configuration is similar to the configuration example shown in FIG. 3. The temporal structure editing section used in this embodiment also has a similar configuration as that shown in FIG. 11. The difference is that the editing objects holding section used in this embodiment holds plural multi-media data elements as objects selected by the user, as well as sequential and parallel structure elements, as a transaction group for batch editing, and performs editing operations for the transaction group.

Figure 14:
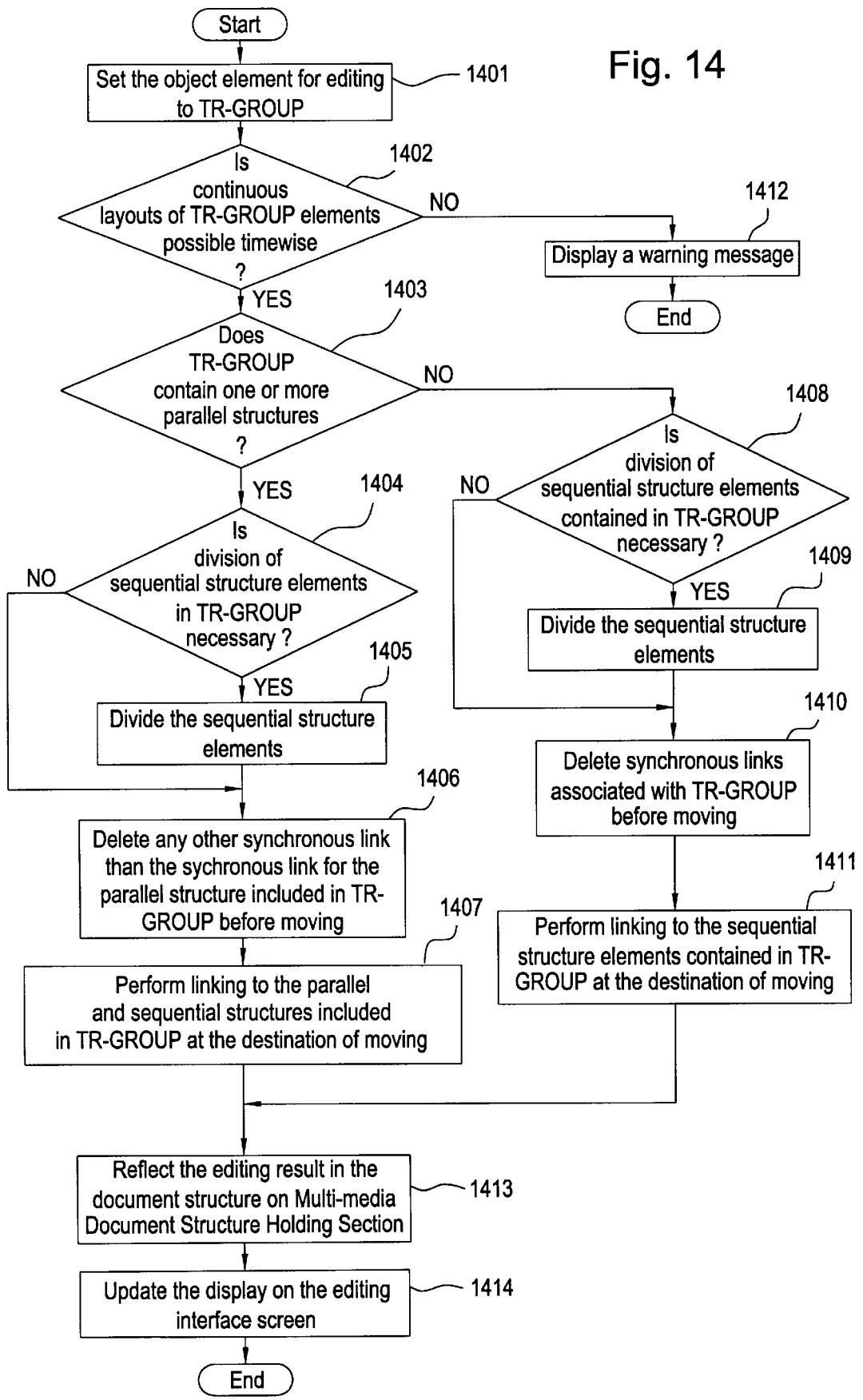
FIG. 14 is a flowchart explaining schematically the operation of a temporal structure analyzing section which performs processing for a transaction loop according to the second embodiment of the present invention.

FIG. 14 is a flowchart for schematically explaining the operation of a temporal structure analyzing section which performs processing for the transaction group in the second embodiment. In the same manner as in the previous case the "moving" operation will be described below with reference to FIGS. 11 and 14.

Upon start of the processing, first in step 1401, a group of plural multi-media data elements and parallel structure element obtained by the editing objects holding section 62 is set as one transaction unit to variable TR-GROUP. Then, in step 1402, a check is made by the temporal structure analyzing section 63 as to whether the elements held in variable TR-GROUP can be subjected to continuous layout timewise, and if the answer is affirmative, the processing routine advances to step 1403, while if the answer is negative, the flow shifts to step 1412, in which a warning message to that effect is displayed, followed by termination of the editing operation. In this case, there is not executed any substantial editing operation.

If in step 1402 it is judged that the elements held in variable TR-GROUP can be subjected to continuous layout timewise, then in step 1403, for judging whether the editing objects of the elements held in variable TR-GROUP can be subjecting to editing operation by a continuous layout of only sequential structure elements, there is made judgment as to whether the variable TR-GROUP contains one or more parallel structure element. If the answer is affirmative, the processing routine advances to step 1404, while if the answer is negative, the flow shifts to step 1408.

In step 1404, there is made judgment as to whether the sequential structure elements included in the variable TR-GROUP are divided by the moving of the multi-media data (elements) as editing objects. If the answer is affirmative, a division processing is needed, so in step 1405, the sequential structure elements are divided into one containing editing objects and one not containing editing objects, then the processing routine advances to step 1406.

On other other hand, if in step 1404 the sequential structure elements are not judged to be divided by moving of the multi-media data as editing objects, it is not necessary to divide the sequential structure elements, so the processing routine skips over step 1405 and advances to step 1406. In step 1406, in the state prior to editing operation, any other synchronous link than the synchronous link allocated to the parallel structure element included in variable TR-GROUP is deleted. Then, in step 1407, synchronous linking required is performed for the parallel and sequential structure elements included in the variable TR-GROUP, at the destination of the moving, and the flow advances to step 1413.

If in the previous step 1403 the variable TR-GROUP does not contain one or more parallel structure elements, the editing operation can be done by the operation of only the sequential structure elements with respect to the editing objects of the structure elements held in the variable TR-GROUP, so in the processing from step 1408 only the sequential structure elements and the multi-media data contained therein are regarded as editing objects.

In this case, first in step 1408, it is judged whether the sequential structure elements contained in the variable TR-GROUP are divided by moving of the multi-media data as editing objects. If the answer is affirmative, it becomes necessary to divide the sequential structure elements, and in this case, in step 1409 the sequential structure elements are divided into one containing editing objects and one not containing editing objects, then the processing routine advances to step 1410.

On the other hand, if in step 1408 the sequential structure elements are not judged to be divided by the editing of moving, it is not necessary to divide the sequential structure elements, the flow skips over step 1409 and advances to step 1410. In step 1410, the synchronous links associated with the variable TR-GROUP are deleted prior to moving, then in step 1411 synchronous linking required is performed for the sequential structure elements included in the variable TR-GROUP at the destination of moving, and the flow advances to step 1413.

In step 1413, the document structure of the editing result which has been modified by the editing operation here executed is reflected in the multi-media document structure holding section 2. Then, in the next step 1414, the display on the editing interface screen is updated on the basis of the document structure (structural information) in the multi-media document structure holding portion 2 to complete the editing operation here executed.

Through such editing operations, it is possible to effect the editing of moving the selected plural multi-media elements as well as sequential and parallel structure elements on the editing interface screen while keeping their interrelation intact. Thus, the display can be updated as a new document structure information.

The following description is now provided about a modification of the multi-media document editing system of the invention. According to the multi-media document editing systems of the first and second embodiments, as described above, the multi-media document is expressed its temporal structure as structural information including layout of its related multi-media data, by both sequential structure elements which control sequential reproduction information pieces of the multi-media data through order links and parallel structure elements which controls the relation between the sequential structure elements through synchronous links for synchronizing the reproduction timing. A spatial structure of the multi-media document is expressed in terms of display coordinate values controlled by a track structure element which controls the sequential structure elements allocated to the same display area. In the synchronous linking here conducted, by making a modification so as to provide a time offset, it becomes possible to introduce the same effect into the structural information of the multi-media document even without performing the editing operation of "moving" for the structure elements as set forth above.

More specifically, in the case where a time offset is set to the synchronous links in the structural information of the multi-media document, the same document is reconstructed and reproduced and displayed in accordance with the linking relation of the sequential and parallel structure elements of the structural information, as noted previously, so the display timing of each multi-media data element is scheduled in consideration of the above time offset. Thus, as long as the modification is of a slight temporal structure in the structural information, the modification can be done easily by setting a time offset to the synchronous links.

In such time offset setting operation for the synchronous links, for example in the editing operation on the editing interface screen (FIG. 10), the position of the display pattern of the rightward, triangular start synchronous link or of the leftward, triangular end synchronous link is shifted in the X axis direction of the time axis by an editing operation of the screen in such a manner that a time offset can be set to those synchronous links. In this case, the data format of the link structure elements (FIG. 8) is deformed into a structure where an offset time slot for holding the offset time is further added. The offset time which has been set by the editing operation is held in the offset time slot.

Through such editing operations, there is performed on the editing interface screen (FIG. 10) an editing of rectangular or triangular display patterns displayed in a two-dimensional space based on virtual time, and such editing operations as addition, deletion and moving can be done easily in an efficient manner with the corresponding multi-media data elements, sequential and parallel structure elements, track structure elements and synchronous links as units.

Further, since plural elements are selected as objects and the time relation between the selected plural multi-media data elements and structure elements is held in a relative manner, then in this state it is possible to effect the editing operation of moving, etc., there is provided an efficient editing interface which permits the execution of a batch editing operation. If as a result of this batch operation there is lost a time consistency between the sequential structure elements which hold the multi-media data group and a parallel structure element which correlates the sequential structure elements through synchronous links, there is made a modification so as to insert a multi-media data element which expresses a blank into the temporal structure, whereby it is possible to render the editing operation efficiently. Editing such as moving can be effected at the same time. Also by notifying the loss of time consistency to the operator it is possible to avoid wasteful editing operation and attain a more efficient editing. It is also possible to prevent the occurrence of error in the editing operation.

According to the multi-media document editing system of the present invention, as set forth hereinabove, by storing plural multi-media data elements and by editing a multi-media document containing structural information related to reproduction time and display position of each of the stored multi-media data elements, it is possible to easily edit the display position (spatial structure) of the multi-media data group as well as the display start and display end (temporal structure). In this case, the editing operation can be done easily by performing operations on the editing interface screen. Thus, the editing of plural multi-media data elements can be effected easily by editing structural information of the multi-media document.

Moreover, since the temporal structure in the structural information of the multi-media document is composed of sequential structure elements which control sequential reproduction information pieces of multi-media data in order of time through order links and a parallel structure element which correlates the sequential structure elements and controls that relation through synchronous links for synchronizing the reproduction timing, it is possible to effect an editing operation for such structural information with the sequential and parallel structural elements in the structure information of the multi-media document as units. Thus, the editing for the temporal structure of multi-media data can be done easily without the need of performing complicated operations because it involves only the editing operation for connection through link structure elements.

Further, since a time offset can be designated in the synchronous links which are designated to sequential and parallel structure elements, once this time offset is designated, it is possible to schedule the display timing of each multi-media data element in consideration of the time offset at the time of reconstructing and regenerating the multi-media document. Consequently, if the change to be made is a slight temporal structure change, it can be done in terms of marker selection of synchronous links, thus permitting a simple editing not requiring alteration of the whole.

What is claimed is:

1. A multi-media document editing system comprising:
   I. a multi-media data memory means for storing multi-media data elements;
   II. a multi-media document memory means for storing a multi-media document containing structural information, said structural information comprising:
      A. a sequential structure element for connecting the elements stored in said multi-media data memory means in order of reproduction time, said sequential structure element having:
         a. a start time; and
         b. at least one order link that references said multi-media data elements;
      B. a parallel structure element including:
         a. synchronous links for connecting said sequential structure element with another sequential structure element so that the reproduction start time is the same as that of said sequential structure element;
         b. a relative time between the time of reproducing said sequential structure element and the time of reproducing said another sequential structure element;
         c. a start time; and
         d. at least one synchronous link that references said sequential structure element; and
      C. a track structure element for connecting said sequential structure element with another sequential structure element when the multi-media data elements linked by said sequential structure element are displayed together, said track structure element having:
         a. a media type indicator,
         b. a display stream indicator; and
         c. at least one of
            (a). a reference to said sequential structure element, and
            (b). said parallel structure element; and
   III. an editing means for performing an editing operation on the structural information stored in said multi-media document memory means, wherein said editing means includes:
      A. a judging means, which upon execution of the editing operation, judges whether superimposition has occurred on a time axis as a multi-media data element reproducing time axis; and
      B. a warning means which, when the occurrence of superimposition has been judged by said judging means, tells the operator to that effect without executing the editing operation.

* * * * *